(12) United States Patent
Kim

(10) Patent No.: US 6,999,744 B2
(45) Date of Patent: Feb. 14, 2006

(54) MEASUREMENT OF LOCAL OSCILLATION LEAKAGE IN A RADIO FREQUENCY INTEGRATED CIRCUIT

(75) Inventor: Hea Joung Kim, El Segundo, CA (US)

(73) Assignee: Broadcom Corp, Irvine, CA (US)

( * ) Notice: Subject to any disclaimer, the term of this patent is extended or adjusted under 35 U.S.C. 154(b) by 475 days.

(21) Appl. No.: 10/255,258

(22) Filed: Sep. 26, 2002

(65) Prior Publication Data
US 2004/0203548 A1 Oct. 14, 2004

(51) Int. Cl.
*H04B 1/10* (2006.01)
(52) U.S. Cl. .................. 455/310; 455/323; 455/296; 455/78; 375/296
(58) Field of Classification Search ............ 455/226.2, 455/226.1, 296, 313, 323, 324, 326, 114.2, 455/115.1, 118, 67.13, 310, 78; 327/113; 375/296; H04B 1/10
See application file for complete search history.

(56) References Cited

U.S. PATENT DOCUMENTS

| | | | |
|---|---|---|---|
| 6,236,840 B1 * | 5/2001 | Aihara et al. ................. 455/83 |
| 6,668,162 B1 * | 12/2003 | Murtojarvi ................ 455/115.1 |
| 6,711,396 B1 * | 3/2004 | Bergsma et al. ............. 455/317 |
| 6,785,530 B2 * | 8/2004 | Hatcher et al. ............. 455/326 |
| 2002/0160740 A1 * | 10/2002 | Hatcher et al. ............. 455/317 |
| 2003/0045249 A1 * | 3/2003 | Nielsen ....................... 455/118 |
| 2003/0194984 A1 * | 10/2003 | Toncich et al. | |
| 2004/0106380 A1 * | 6/2004 | Vassiliou et al. ............. 455/73 |

* cited by examiner

*Primary Examiner*—Edward F. Urban
*Assistant Examiner*—Blane J. Jackson
(74) *Attorney, Agent, or Firm*—Garlick, Harrison & Markison LLP; Timothy W. Markison

(57) ABSTRACT

The measuring of local oscillation leakage in radio frequency integrated circuits (RFICs) begins by concurrently enabling a transmitter portion and a receiver portion of a radio frequency integrated circuit. The processing then continues by providing a zero input to the transmitter portion such that information contained in the RF signals corresponds to local oscillation leakage produced by the transmitter portion. The processing continues by detecting the concurrent enablement of the transmitter and receiver portions. The processing continues by measuring, via the receiver portion, the received signal strength of the RF signals. The processing continues by processing the received signal strength over a predetermined period of time commencing upon the detection of the concurrent enablement to obtain a measure of the local oscillation leakage.

15 Claims, 5 Drawing Sheets

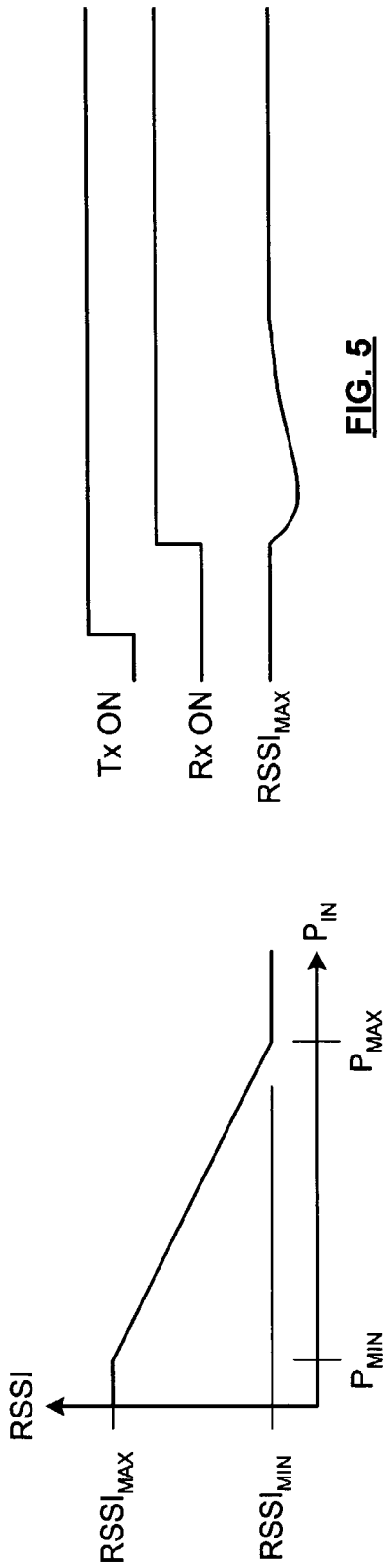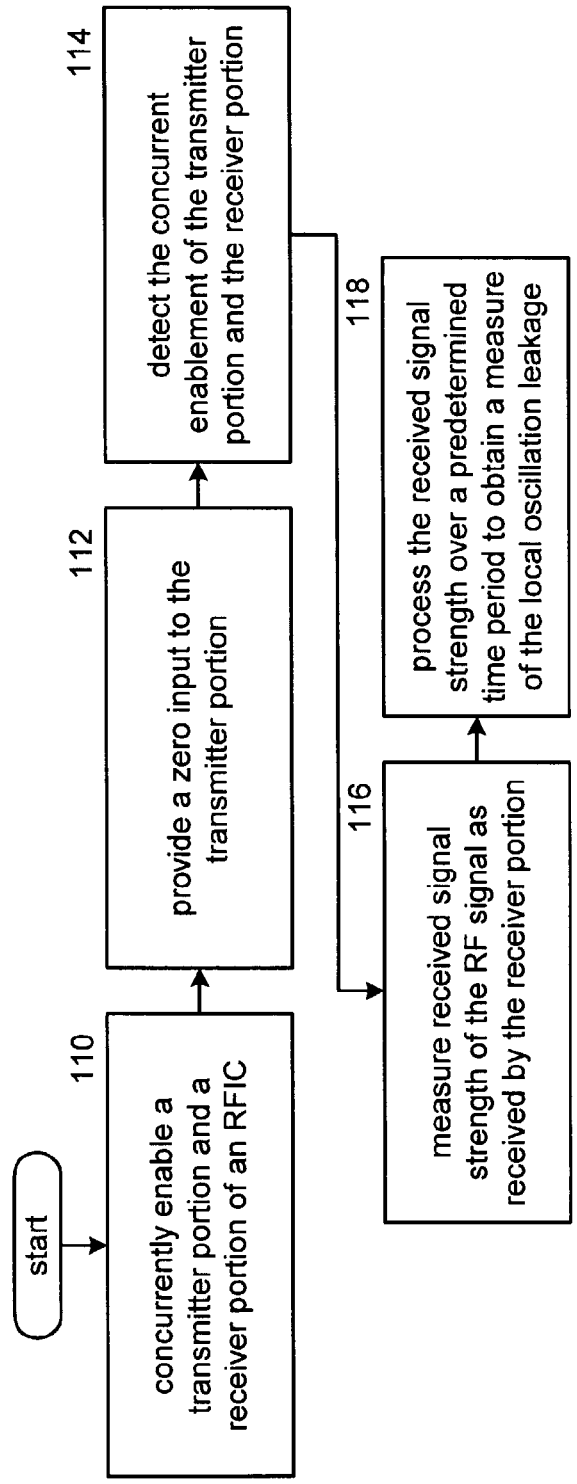

MEASUREMENT OF LOCAL OSCILLATION LEAKAGE IN A RADIO FREQUENCY INTEGRATED CIRCUIT

BACKGROUND OF THE INVENTION

1. Technical Field of the Invention

This invention relates generally to wireless communication systems and more particularly to radio frequency integrated circuits used within such wireless communication systems.

2. Description of the Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Typically, the data modulation stage produces baseband signals to include a digital in-phase component and a digital quadrature component. The digital in-phase and quadrature components are converted to the analog domain using digital-to-analog converters (DAC). The analog in-phase component is then mixed with an analog in-phase component of the local oscillation, while the Q component is mixed with a Q component of the local oscillation. The resulting mixed signals are then summed together to produce RF signals.

For direct conversion radios (those that convert directly from baseband to RF), if the I and Q processing circuitry of the data modulation stage are identically matched, the DACs are identically matched, and the elements of the mixers are identically matched, the resulting RF signals will be free from errors associated with mixing signals, which is generally referred to as local oscillation (LO) leakage. In practice, however, local oscillation leakage is produced because ideal matching of circuits and components thereof is not achievable. To minimize the effects of local oscillation leakage, direct conversion transmitters include local oscillation leakage compensation circuitry, which compensates for the mismatches of the DACs, and/or of the mixers.

An issue with local oscillation leakage compensation circuits is determining an appropriate setting. This issue arises in most, if not all, direct conversion radios because such radios include other compensation circuitry to correct for DC offset, frequency offsets, et cetera. When these other compensation circuits are active, they mask the LO leakage without compensating for it, thus making it difficult to obtain an accurate measure of LO leakage. Without an accurate measure of LO leakage, accurate compensation thereof is difficult.

Therefore, a need exists for a method and apparatus that accurately measures LO leakage within radio frequency integrated circuits and accurately compensates therefore.

BRIEF SUMMARY OF THE INVENTION

The measuring of local oscillation leakage in radio frequency integrated circuits (RFICs) of the present invention substantially meets these needs and others. A method for measuring local oscillation leakage begins by concurrently enabling a transmitter portion and a receiver portion of a radio frequency integrated circuit. The processing then continues by providing a zero input to the transmitter portion such that information contained in the RF signals corresponds to local oscillation leakage produced by the transmitter portion. The processing continues by detecting the concurrent enablement of the transmitter and receiver portions. The processing continues by measuring, via the receiver portion, the received signal strength of the RF signals. The processing continues by processing the received signal strength over a pre-determined period of time commencing upon the detection of the concurrent enablement to obtain a measure of the local oscillation leakage. The processing may be done by integrating the received signal strength over the pre-determined period of time, which corresponds to the time it takes for other compensation circuits within the RFIC to reach their steady state positions or by averaging peaks of the received signal strength over the predetermined period of time. Alternatively, the local oscillation leakage may be calculated from a measure of an in-phase component and a quadrature component with the zero input applied to the receiver.

Once an accurate measure of local oscillation leakage is obtained, the settings of mismatched correction circuitry within digital-to-analog converters and/or within mixers, can be accurately set. Alternatively, each of the various settings for the mismatched circuitry may be selected and the corresponding LO leakage measured. The setting providing the lowest measure of LO leakage is thus utilized for the mismatch correction circuitry.

BRIEF DESCRIPTION OF THE SEVERAL VIEWS OF THE DRAWINGS

FIG. 4 is a graph plotting received signal strength indication versus input power in accordance with the present invention;

FIG. 5 is a timing diagram for measuring local oscillation leakage in accordance with the present invention;

FIG. 6 is a logic diagram of a method for measuring local oscillation leakage in accordance with the present invention.

DETAILED DESCRIPTION OF THE INVENTION

Figure 1:
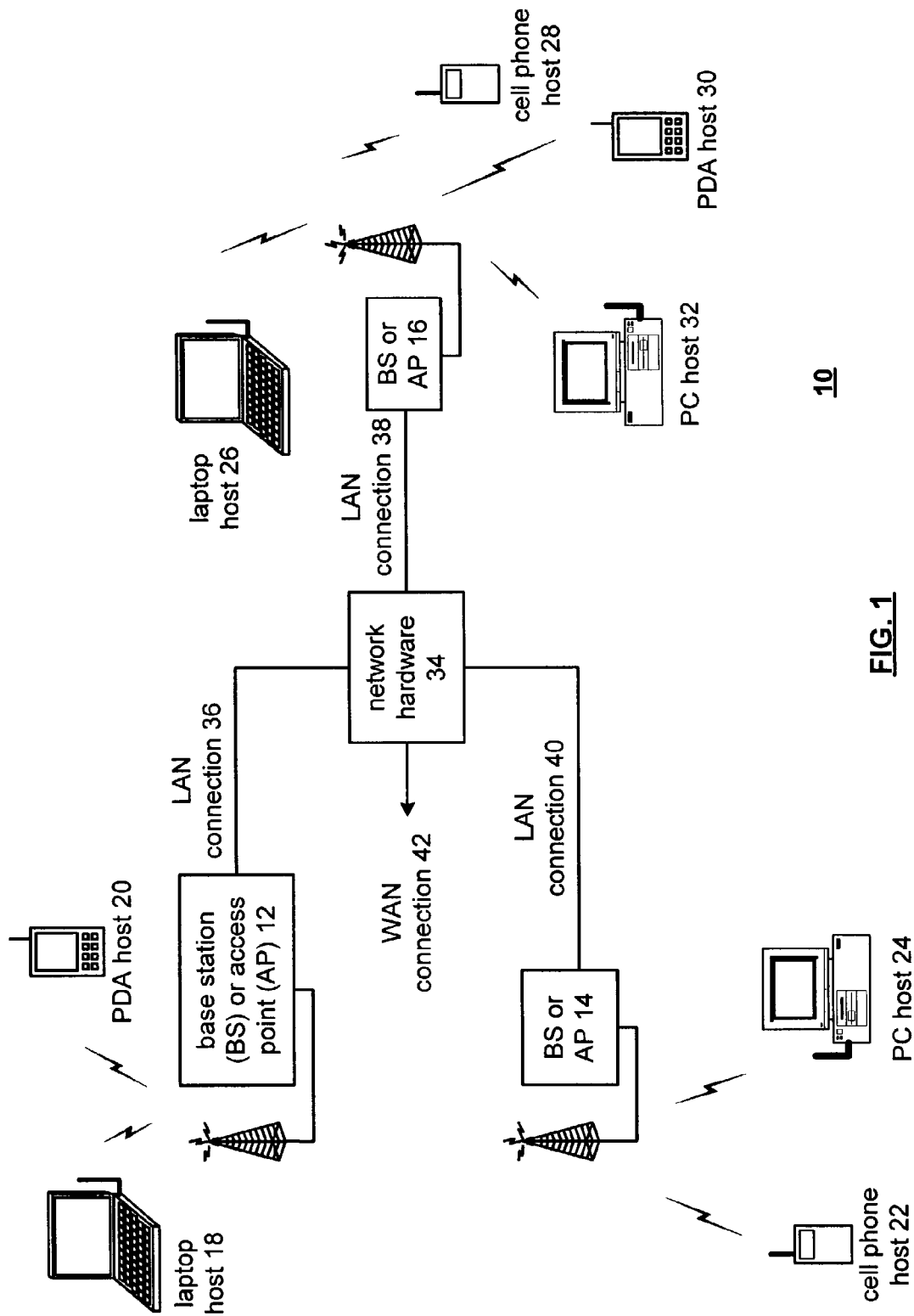
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
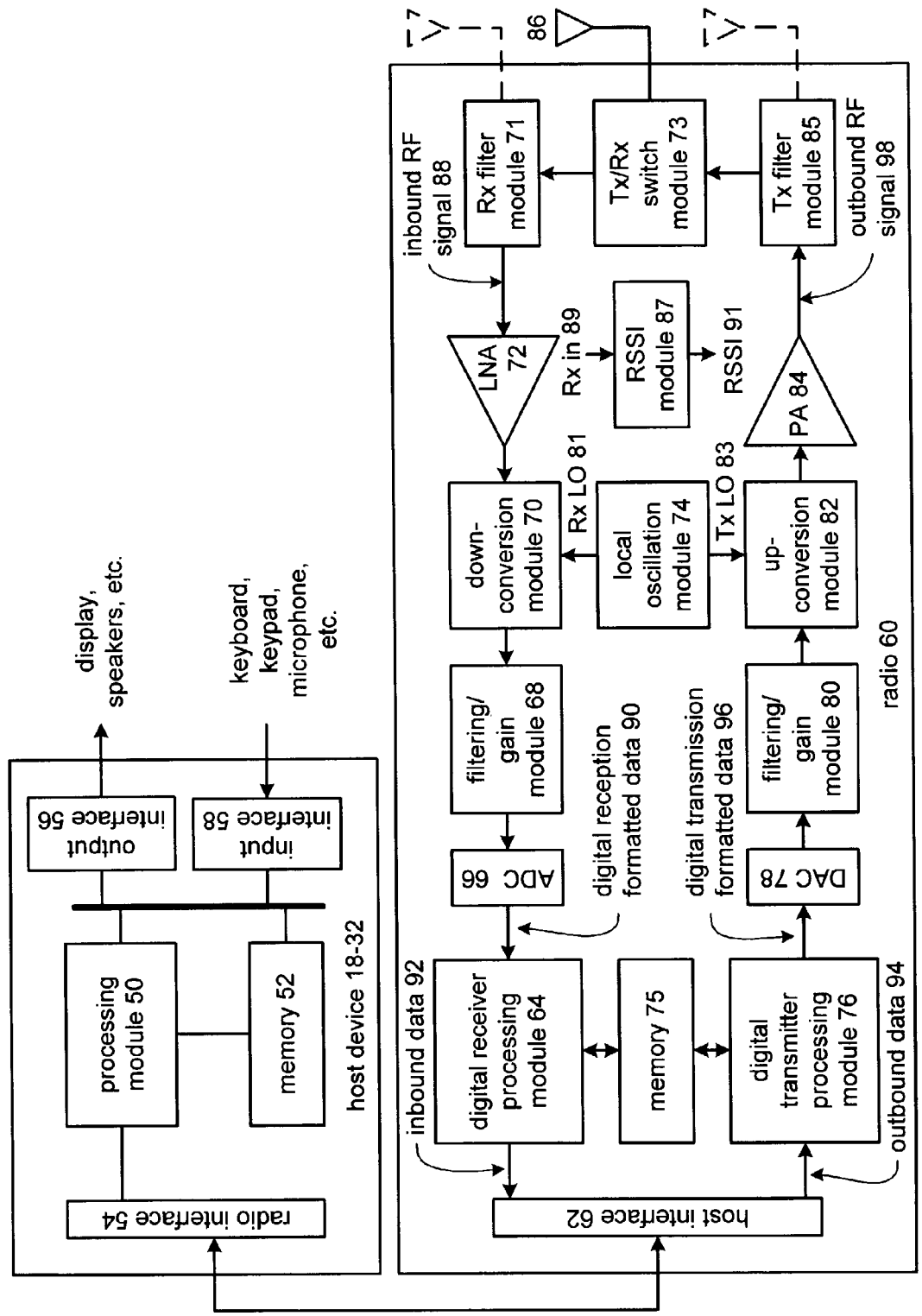
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a received signal strength indication (RSSI) module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11*a*, IEEE 802.11*b*, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. The RSSI module 87 measures the RSSI 91 of the received signal 89, which may be the output of the LNA 72, the output of the down-conversion module 70, the digital reception formatted data 90, the inbound data 92, or intermediaries thereof.

The analog-to-digital converter 66 converts the filtered inbound signal from the analog domain to the digital domain to produce digital reception formatted data 90. The digital receiver processing module 64 decodes, descrambles, demaps, equalizes channel response, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
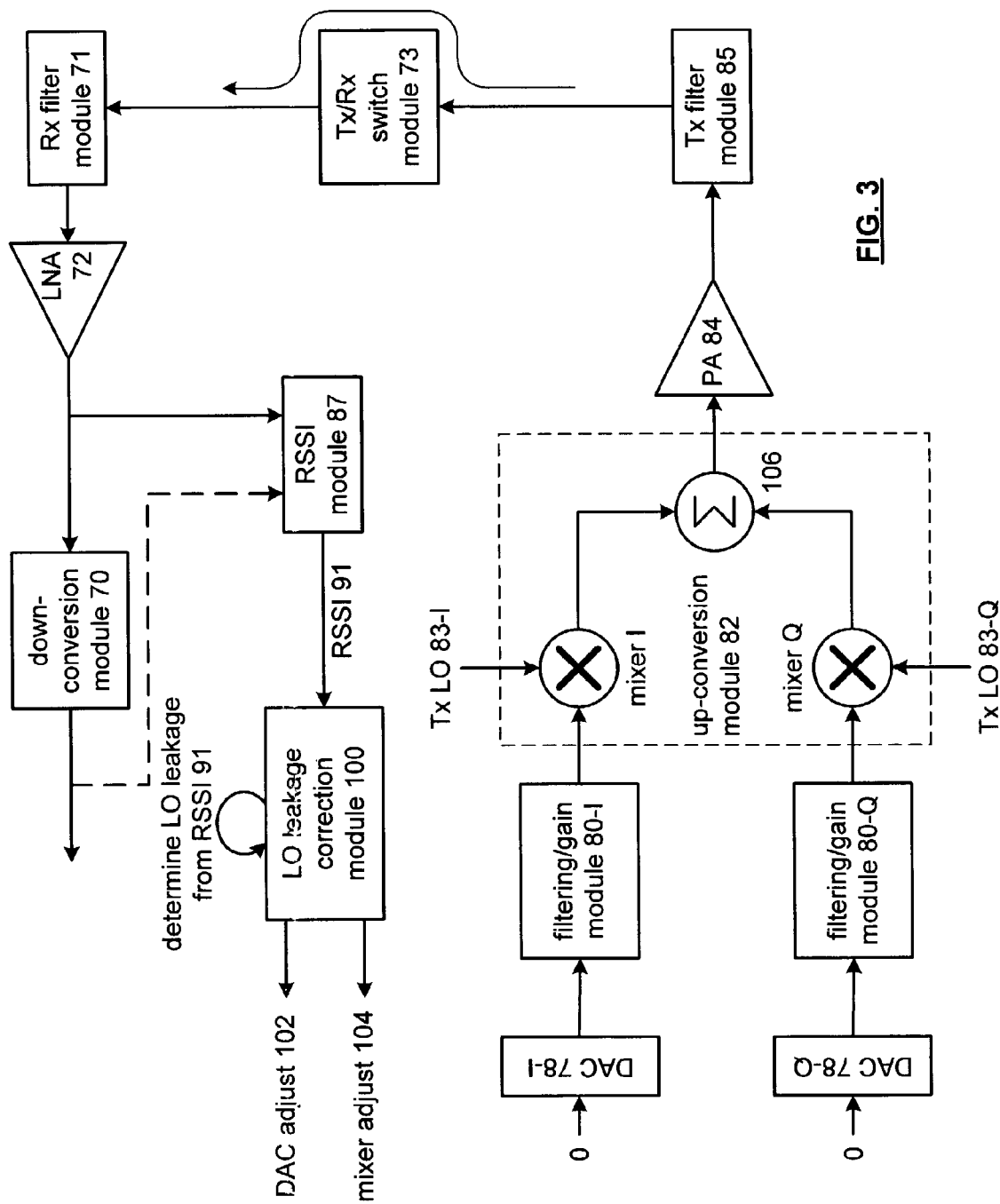
FIG. 3 is a schematic block diagram of a transmitter portion and receiver portion of a wireless communication device in accordance with the present invention.

FIG. 3 is a schematic block diagram of the transmitter portion and receiver portion of the radio 60 in an LO leakage test mode. In the LO leakage test mode, the digital transmitter processing module 76 produces a zero input for an I component and a Q component of the digital transmission formatted data 96. The zero input I component is provided to an I component DAC 78-I while the zero input Q component is provided to DAC 78-Q. The zero input is an effective zero input, which corresponds to AC ground for inputs of the DACs 78-I and 78-Q. For example, if the DACs 78-I and 78-Q have an input range from 0 volts to 1.8 volts, where the zero corresponds to a maximum negative value and the 1.8 corresponds to a maximum positive value, the effective zero input will be 0.9 volts.

The digital-to-analog converters 78-I and 78-Q have the same topology (e.g., delta sigma, flash, etc.) and each DAC includes mismatch correction circuitry. The mismatch correction circuitry is set in accordance with the teachings of the present invention, such that both DACs produce essentially the same output magnitude for the same input magnitude.

The filter/gain modules 80-I and 80-Q filter the analog signals produced by DACs 78-I and 78-Q. The up-conversion module 82 receives the filtered signals via mixer I and mixer Q. During calibration mode, mixer I mixes the in-phase zero input with the I component of the transmitter local oscillation 83. Mixer Q mixes the Q component of the zero input with the Q component of the transmitter local oscillation 83. The zero input I and Q components and the I and Q components of the transmitter local oscillation 83 may be single-ended signals or differential signals. Regardless of the type of signals, mixers I and Q include compensation circuitry to compensate for mismatched components within the respective mixers.

The outputs of mixers I and Q are summed together via summer 106 and amplified via power amplifier 84. At the output of power amplifier 84, most, if not all, of the energy present in the RF signal will be local oscillation leakage, which results due to the mismatches in mixers I and Q and/or the mismatches between DACs 78-Q and 78-I.

With the receiver portion and transmitter portion simultaneously activated, the RF signal produced by the transmitter section will be received by the receiver filter module 71 of the receiver portion. The receiver filter module 71 filters the RF signal, which is the up-converted zero input signal, and provides it to the low noise amplifier 72. The low noise amplifier 72 amplifies the signal and provides it to down-conversion module 70, which produces a baseband signal therefrom.

The RSSI module 87 may measure the received signal strength at the output of LNA 72, at the output of down-conversion module 70, or at a point during data extraction from the baseband signal as performed by the digital receiver processing module 64. For a discussion of a received signal strength module 87 that processes high frequency signals refer to co-pending patent application entitled "DETERMINATION OF RECEIVED SIGNAL STRENGTH IN A DIRECT CONVERSION RECEIVER" having a docket number of BP 2339 and a filing date of Jul. 22, 2002. The RSSI module 87 measures the RSSI 91 and provides it to the local oscillation leakage correction module 100.

The local oscillation leakage correction module 100, which may be included in the digital receiver processing module 64 and/or in the digital transmitter processing module 76, determines the LO leakage from the RSSI 91. The manner in which the LO leakage correction module 100 determines the LO leakage from RSSI 91 will be described in greater detail with reference to FIGS. 4–7. Alternatively, the LO leakage may be determined from the digital I and digital Q components outputted by the down-conversion module. For example, by determining, or approximating, the square root of $I^2 + Q^2$, the power level of the received signal can be determined. Since, during this test, the input signal is zero, the resulting calculated power is due to LO leakage.

Having determined the LO leakage, the LO leakage correction module 100 generates a DAC adjustment signal 102 and/or a mixer adjustment signal 104. Accordingly, once the LO leakage is accurately determined, the compensation circuitry within the digital-to-analog converters 78-I and 78-Q and/or the correction circuitry within mixer I and mixer Q may be set to effectively remove, or substantially reduce, LO leakage from the transmitter portion of the radio.

FIG. 4 is a graph that plots received signal strength indication (RSSI) versus input power as measured by the RSSI module 87. As shown, as the input power increases, the RSSI value decreases. Thus, at minimum input power (e.g., –85 dBm), the measured RSSI value is at a maximum (e.g., 1.0 volts). Correspondingly, when the input power is at a maximum (e.g., –40 dBm), the RSSI value is at a minimum (0.2 volts). As one of average skill in the art will appreciate, the RSSI to input power may be reversed such that maximum input power corresponds to a maximum RSSI value and a minimum input power corresponds to a minimum RSSI value.

FIG. 5 is a timing diagram illustrating the measure of RSSI attributed to LO leakage when the transmitter portion is being fed with a zero input. As shown, the transmitter portion is enabled and a short duration later, the receiver portion is enabled. With both the receiver and transmitter enabled, for a brief period of time (less than 20 microseconds), the RSSI value indicates the presence of a signal. The short duration of time corresponds to the time it takes for other compensation circuitry within the radio to remove other errors such as DC offset, frequency offset, et cetera.

During this short period of time, the RSSI value may be processed to determine the LO leakage. One method for processing the RSSI value is to integrate it over the short period of time to obtain the corresponding LO leakage. Another method may be average the RSSI peaks over the short period of time. Once the LO leakage is accurately determined, the mismatched correction circuitry within DACs 78-I and 78-Q and/or within mixers I and Q may be accurately set to effectively remove the LO leakage.

FIG. 6 is a logic diagram of a method for measuring LO leakage within a radio frequency integrated circuit. The process begins at Step 110 where a transmitter portion and a receiver portion of a radio frequency integrated circuit are concurrently enabled. The process then proceeds to Step 112 where a zero input, i.e., an effective zero input, is provided to the transmitter portion. This may be done via a write register that effectively disconnects the receiver section from the antenna. The process then proceeds to Step 114 where the concurrent enablement of the transmitter and receiver portions is detected. The process then proceeds to Step 116 where the receiver portion of the RFIC measures the received signal strength indication of the RF signal.

The process then proceeds to Step 118 where the received signal strength indication is processed over a pre-determined period of time to obtain a measure of the local oscillation leakage. The processing may be done by integrating the received signal strength indication over the pre-determined period of time to obtain the measure of the local oscillation leakage.

Once the local oscillation leakage is obtained, the settings of mismatched circuitry within digital-to-analog converters may be adjusted based on the measure of LO leakage to effectively remove, or substantially reduce, LO leakage from the transmitted RF signal. In addition, or as an alternative, the settings of mismatched correction circuitry within the mixers may be adjusted based on the measure of LO leakage to effectively remove, or substantially reduce, the LO leakage from the transmitted RF signal.

As an alternative to calculating the appropriate setting of the mismatch correction circuitry of the DACs and/or mixers, each available setting for the mismatched circuitry within the mixer and/or within the digital-to-analog converters may be selected and the corresponding LO leakage measured. The setting yielding the lowest LO leakage is chosen to be the appropriate setting.

Figure 7:
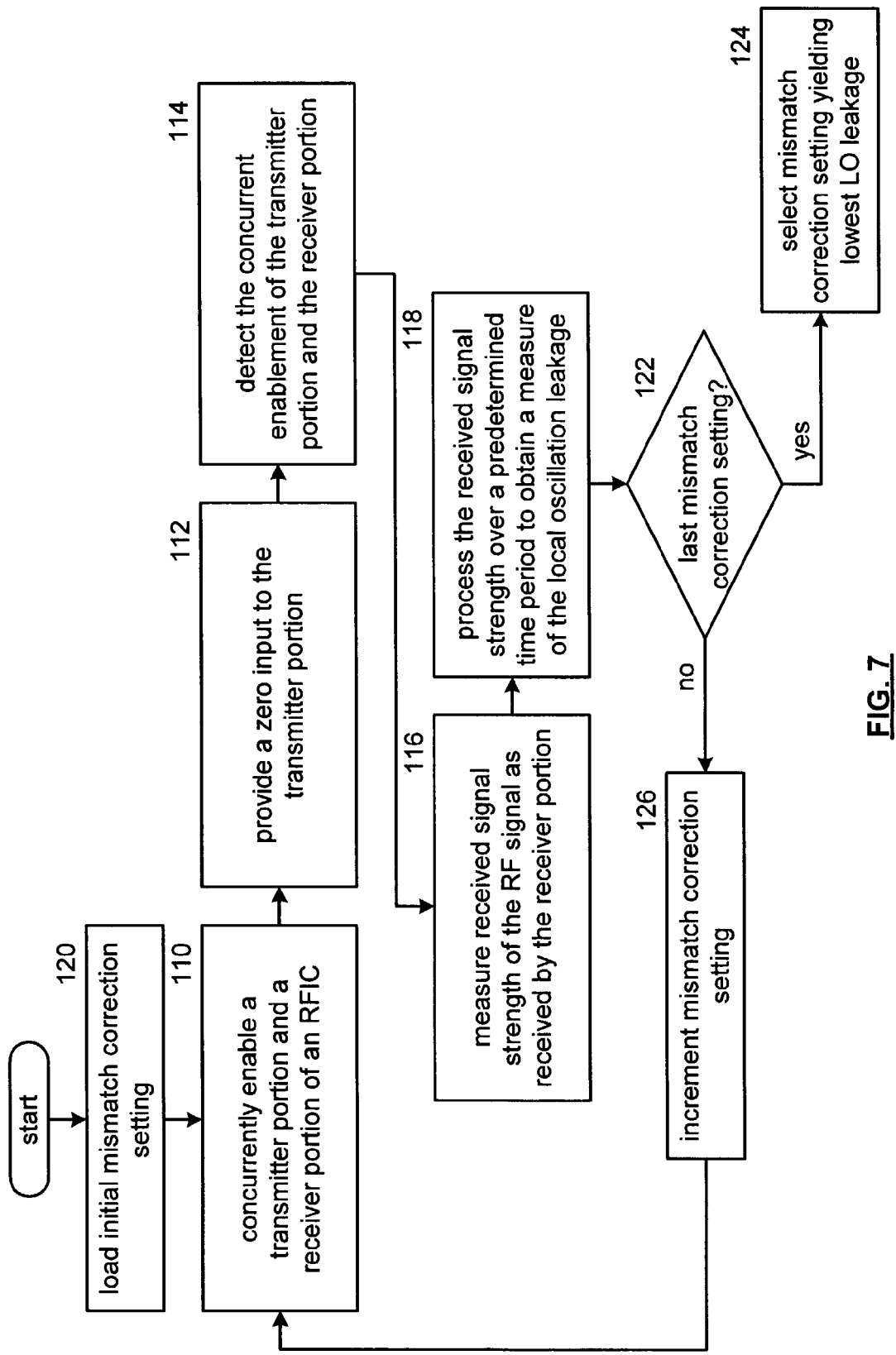
FIG. 7 is a logic diagram of an alternate method for measuring local oscillation leakage in accordance with the present invention.

FIG. 7 illustrates an alternate method for measuring LO leakage within a radio frequency integrated circuit and applications for suppressing LO leakage. The process begins at Step 120 where an initial mismatched correction setting is loaded into the correction circuitry of a mixer and/or digital-to-analog converter. The process then proceeds to Step 110–118, which were described in FIG. 6.

The process then proceeds to Step 122 where a determination is made as to whether the last mismatched correction setting has been tested. If not, the process proceeds to Step 126 where the mismatched correction setting is incremented to the next setting and the process repeats at Step 110. If, however, the last mismatched correction setting has been tested, the process proceeds to Step 124 where the mismatched correction setting yielding the lowest LO leakage is selected for the mismatched correction circuitry.

The preceding discussion has presented a method and apparatus for measuring LO leakage in a radio frequency integrated circuit. By obtaining an accurate measure of LO leakage, corresponding LO leakage correction circuitry may be accurately tuned to effectively remove, or substantially reduce, LO leakage from a transmitter portion of the radio frequency integrated circuit. As one of average skill in the art will appreciate, other embodiments may be derived from the teaching of the present invention, without deviating from the scope of the claims.

What is claimed is:

1. A method for measuring local oscillation leakage in a radio frequency integrated circuit (RFIC), the method comprises:
concurrently enabling a transmitter portion of the RFIC and a receiver portion of the RFIC;
providing a zero input to the transmitter portion, wherein the transmitter portion up converts the zero input via a mixer section to produce a radio frequency (RF) signal;
detecting the concurrent enablement of the transmitter portion and the receiver portion;
measuring received signal strength of the RF signal as received by the receiver portion upon detecting the concurrent enablement;
processing the received signal strength over a predetermined time period to obtain a measure of the local oscillation leakage; and
adjusting setting of mismatch correction circuitry within digital to analog converters that convert an in-phase component of the zero input into a digital in-phase component and convert a quadrature component of the zero input into a digital quadrature component based on the measure of the local oscillation leakage.

2. The method of claim 1, wherein the processing the received signal strength further comprises:
integrating the received signal strength over the predetermined time period to obtain the measure of the local oscillation leakage.

3. The method of claim 1 further comprises:
adjusting setting of mismatch correction circuitry within mixers of the transmitter portion based on the measure of the local oscillation leakage.

4. The method of claim 1 further comprises:
repeating the concurrent enabling, providing, detecting, measuring, and processing for a plurality of mismatch correction settings of mixers within the transmitter portion; and
selecting one of the plurality of mismatch correction settings having a lowest corresponding measure of local oscillation leakage.

5. The method of claim 1 further comprises:
repeating the concurrent enabling, providing, detecting, measuring, and processing for a plurality of mismatch correction settings of digital to analog converters that convert an in-phase component of the zero input into a digital in-phase component and convert a quadrature component of the zero input into a digital quadrature component;
wherein the step of adjusting setting of mismatch circuitry within digital to analog converters further includes, selecting one of the plurality of mismatch correction settings having a lowest corresponding measure of local oscillation leakage.

6. An apparatus for measuring local oscillation leakage in a radio frequency integrated circuit (RFIC), the apparatus comprises:
processing module; and
memory operably coupled to the processing module, wherein the memory stores operational instructions that cause the processing module to:
concurrently enable a transmitter portion of the RFIC and a receiver portion of the RFIC;
provide a zero input to the transmitter portion, wherein the transmitter portion up converts the zero input via a mixer section to produce a radio frequency (RF) signal;
detect the concurrent enablement of the transmitter portion and the receiver portion;
measure received signal strength of the RF signal as received by the receiver portion upon detecting the concurrent enablement;
process the received signal strength over a predetermined time period to obtain a measure of the local oscillation leakage; and
adjust setting of mismatch correction circuitry within digital to analog converters that convert an in-phase component of the zero input into a digital in-phase component and convert a quadrature component of the zero input into a digital quadrature component based on the measure of the local oscillation leakage.

7. The apparatus of claim 6, wherein the memory further comprises operational instructions that cause the processing module to process the received signal strength by:
integrating the received signal strength over the predetermined time period to obtain the measure of the local oscillation leakage.

8. The apparatus of claim 6, wherein the memory further comprises operational instructions that cause the processing module to:
adjust setting of mismatch correction circuitry within mixers of the transmitter portion based on the measure of the local oscillation leakage.

9. The apparatus of claim 6, wherein the memory further comprises operational instructions that cause the processing module to:
repeat the concurrent enabling, providing, detecting, measuring, and processing for a plurality of mismatch correction settings of mixers within the transmitter portion; and
select one of the plurality of mismatch correction settings having a lowest corresponding measure of local oscillation leakage.

10. The apparatus of claim 6, wherein the memory further comprises operational instructions that cause the processing module to:
repeat the concurrent enabling, providing, detecting, measuring, and processing for a plurality of mismatch correction settings of digital to analog converters that convert an in-phase component of the zero input into a digital in-phase component and convert a quadrature component of the zero input into a digital quadrature component; and
select one of the plurality of mismatch correction settings having a lowest corresponding measure of local oscillation leakage.

11. A radio frequency integrated circuit (RFIC) comprises:
transmitter section operably coupled to convert outbound data into outbound radio frequency (RF) signals;
receiver section operably coupled to convert inbound RE signals into inbound data; and
local oscillation correction module operably coupled to:
concurrently enable a transmitter portion of the RFIC and a receiver portion of the RFIC;
provide a zero input to the transmitter portion, wherein the transmitter portion up converts the zero input via a mixer section to produce a radio frequency (RF) signal;
detect the concurrent enablement of the transmitter portion and the receiver portion;
measure received signal strength of the RF signal as received by the receiver portion upon detecting the concurrent enablement;

process the received signal strength over a predetermined time period to obtain a measure of the local oscillation leakage; and adjust setting of mismatch correction circuitry within digital to analog converters that convert an in-phase component of the zero input into a digital in-phase component and convert a quadrature component of the zero input into a digital quadrature component based on the measure of the local oscillation leakage.

12. The RFIC of claim 11, wherein the processing the received signal strength further comprises:

integrating the received signal strength over the predetermined time period to obtain the measure of the local oscillation leakage.

13. The RFIC of claim 11, wherein the local oscillation correction module further functions to:

adjust setting of mismatch correction circuitry within mixers of the transmitter portion based on the measure of the local oscillation leakage.

14. The RFIC of claim 11, wherein the local oscillation correction module further functions to:

repeat the concurrent enabling, providing, detecting, measuring, and processing for a plurality of mismatch correction settings of mixers within the transmitter portion; and select one of the plurality of mismatch correction settings having a lowest corresponding measure of local oscillation leakage.

15. The RFIC of claim 11, wherein the local oscillation correction module further functions to:

repeat the concurrent enabling, providing, detecting, measuring, and processing for a plurality of mismatch correction settings of digital to analog converters that convert an in-phase component of the zero input into a digital in-phase component and convert a quadrature component of the zero input into a digital quadrature component; and select one of the plurality of mismatch correction settings having a lowest corresponding measure of local oscillation leakage.

* * * * *